(12) United States Patent
Canini et al.

(10) Patent No.: US 8,276,819 B2
(45) Date of Patent: Oct. 2, 2012

(54) OPTICAL CODE READER

(75) Inventors: Federico Canini, Zola Predosa (IT);
Guido Maurizio Oliva, Rovigo (IT);
Donato Vincenzi, Cento (IT); Belinda Bernagozzi, Bologna (IT)

(73) Assignee: Datalogic Scanning Group S.r.l., Lippo di Calderara di Reno (BO) (IT)

( * ) Notice: Subject to any disclaimer, the term of this patent is extended or adjusted under 35 U.S.C. 154(b) by 681 days.

(21) Appl. No.: 12/158,745

(22) PCT Filed: Dec. 20, 2006

(86) PCT No.: PCT/EP2006/012294
§ 371 (c)(1),
(2), (4) Date: Aug. 26, 2009

(87) PCT Pub. No.: WO2007/076931
PCT Pub. Date: Jul. 12, 2007

(65) Prior Publication Data
US 2009/0308926 A1    Dec. 17, 2009

(30) Foreign Application Priority Data
Dec. 30, 2005  (EP) .................................... 05425950

(51) Int. Cl.
*G06K 7/00*    (2006.01)
*G06K 7/10*    (2006.01)
*G02B 5/08*    (2006.01)
*G02B 26/08*   (2006.01)

(52) U.S. Cl. ............ 235/454; 235/435; 235/462.01; 235/462.35; 359/209.1; 359/210.1

(58) Field of Classification Search ............... 235/435, 235/454, 462.01–462.49; 359/209.1, 210.1
See application file for complete search history.

(56) References Cited

U.S. PATENT DOCUMENTS

| 5,308,966 | A | 5/1994 | Danielson et al. |
| 6,039,255 | A | 3/2000 | Seo |
| 2004/0118927 | A1* | 6/2004 | Breytman et al. ........ 235/462.37 |
| 2006/0175411 | A1* | 8/2006 | Itou .......................... 235/462.01 |

FOREIGN PATENT DOCUMENTS

GB    2225659 A    6/1990

OTHER PUBLICATIONS

International Search Report and Written Opinion for PCT/EP2006/012294 dated Feb. 28, 2007.

* cited by examiner

*Primary Examiner* — Michael G Lee
*Assistant Examiner* — Laura Gudorf
(74) *Attorney, Agent, or Firm* — Duane Morris LLP (57) ABSTRACT

An optical code reader of the imager type includes: at least one non-collimated light source having an illumination optics associated therewith including at least one lens; and a photodetector device having a receiving optics associated therewith including at least one lens, wherein the at least one lens of the illumination optics and the at least one lens of the receiving optics are displaceable together to change their distance from the at least one light source and from said photodetector device respectively.

23 Claims, 9 Drawing Sheets

OPTICAL CODE READER

FIELD OF THE INVENTION

The present invention concerns an optical code reader.

BACKGROUND OF THE INVENTION

As it is well known, an optical code is information coded in the color and possibly in the number and in the relative size of a plurality of elements. The linear codes of the bar type, for example, contain an alternate sequence of typically black bars and of typically white spaces, each having a multiple width of a basic width. Two-dimensional optical codes contain a grid of elements of constant shape and size, but of two or more different colors. However, also alphanumeric characters generally form part of the term "optical code" as used in the present description and in the appended claims.

Optical code readers generally comprise means for illuminating the optical code and means for detecting the light diffused by the optical code and for generating an electrical signal the amplitude and phase of which are representative of the color and size of the optical code elements. The electrical signal is properly processed e.g. through filters, amplifiers and digitizers, to obtain a binary representation of the optical code, which is then decoded, in order to obtain the information associated with the specific optical code being read. Part of the optical code reading, typically the decoding, can be transferred to a host processor.

The invention relates more particularly to optical code readers of the imager type, wherein the entire code, or the entire width of a linear code, is simultaneously illuminated, and the light diffused by the entire illuminated optical code is collected and detected through a photodetector device or sensor of the linear or matrix type, respectively in the case of linear and two-dimensional optical codes.

In order to collect the diffused light onto the sensor, the imager readers typically comprise a receiving optics. In the optical code readers it is appropriate to provide for a focusing capability, i.e. that the distance between the receiving optics and the sensor is settable, to allow the reading of optical codes at different distances.

In the imager readers it is also appropriate for the electrical signal to be influenced neither by the non uniformity in the illumination of the different regions of the optical code, e.g. caused by the emitting characteristics of the illumination source/s used, nor by a non-uniform response among the different sensitive regions of the sensor, e.g. caused by the different angles under which they are illuminated by the light diffused by the optical code.

It is therefore known to associate with the light source/s illumination optics that corrects said non uniformity, as for example in GB 2 225 659 A.

Such a document teaches to associate with each of a pair of LEDs (Light Emitting Diode) a lens or a lens portion to focus the light in a direction parallel to the optical code, and a lens or a lens portion to focus the light in a direction orthogonal to the optical code, in order to obtain a thin strip-like illumination line, wherein the illumination at the ends of the strip can be stronger than at the centre. The reader of such document, however, provides for the optical code to be placed in a predetermined position with respect to the reader.

An optical code reader of the imager type includes: at least one non-collimated light source having an illumination optics associated therewith including at least one lens; and a photodetector device having a receiving optics associated therewith including at least one lens, wherein the at least one lens of the illumination optics and the at least one lens of the receiving optics are displaceable together to change their distance from the at least one light source and from the photodetector device, respectively.

These and other aspects and advantages of the reader according to the invention will be better understood from the following detailed description of some embodiments, made with reference to the accompanying drawings, given merely as a not limiting example. The drawings are diagrammatic representations, wherein the hatching filling the different components is used simply for better differentiating them from each other, and is neither indicative of section planes nor of constituent materials. Moreover, some components are shown as if they were transparent, again, only in order to better show the components behind.

BRIEF DESCRIPTION OF THE DRAWINGS

The accompanying drawings illustrate preferred embodiments of the invention, as well as other information pertinent to the disclosure, in which.

DETAILED DESCRIPTION

In the present description and in the appended claims, term "light" is used in a broad sense to indicate not only electromagnetic radiation in the visible spectrum, but also electromagnetic radiation of such wavelengths as to be capable of being manipulated with the optical techniques used for the visible spectrum, therefore to also include the UV and IR regions.

The technical problem at the basis of the present invention is to allow for an efficient illumination of the optical code at different reading distances.

According to the invention such a problem is solved by means of an optical code reader of the imager type, comprising at least one not collimated light source having an illumination optics associated therewith, and a photodetector device having a receiving optics associated therewith, characterized in that at least one lens of the illumination optics and at least one lens of the receiving optics are displaceable together to change their distance from said at least one light source and from said photodetector device, respectively.

Providing to displace together the illumination optics and the receiving optics or at least one lens thereof, the focus distance in the illumination path and in the receiving path is changed simultaneously and in the same direction, thus adapting the reader to a short distance or a long distance reading.

In an embodiment, said at least one light source and said photodetector device are fixed in position within the reader, and said at least one lens of the illumination optics and said at least one lens of the receiving optics are mounted in a structure sliding within the reader.

In such a way, besides allowing in a simple way the focus change, the alignment among the different components is facilitated.

Preferably, furthermore, said at least one light source and said photodetector device are mounted on a common printed circuit board fastened to a bottom wall of the reader, preferably substantially orthogonal thereto, said sliding structure slides on said bottom wall, and said at least one lens of the illumination optics and said at least one lens of the receiving optics are mounted in said sliding structure, preferably substantially parallel to said board.

Alternatively, the common printed circuit board can be parallel to the bottom wall of the reader, oblique mirrors being provided to deflect the light in the emitting path and in the receiving path.

In the present description and in the appended claims, the terms bottom, upper, lateral, front and rear are used with the only aim of simplifying the language, without thereby they having to be considered as limiting the orientation of the reader with respect to an absolute reference, rather only with reference to a relative orientation wherein the front wall of the reader is facing and substantially parallel to the optical code being read.

Advantageously at least one inner wall is provided, upright from said bottom wall towards the interior of the reader, said at least one upright wall serving as a sliding guide for said sliding structure.

Said at least one upright wall, which turns out to be parallel to the sides of the reader, also serves for at least partially bound a receiving chamber comprising the photodetector device and the receiving optics, and one or more illumination chambers, each comprising at least part of the illumination optics and a light source, which result optically separated from each other by the said at least one upright wall itself.

Even if it is possible to change the focus distance in the illumination path and in the receiving path by sliding the sliding structure also during the use of the reader, manually or automatically by providing a proper actuator, according to the invention the desired distance is preferably set in a reader set up step, and such an actuator is missing in order to keep the size, the weight and the cost of the reader low. According to the invention in the reader such a configuration step does not need complicated operations for aligning the components, with consequent savings in the manufacturing process. Moreover, such a configuration step could, alternatively or additionally, be carried on also by the buyer of the reader exactly because it does not need complicated aligning operations.

Thus, in an embodiment the reader comprises a pin in one of the sliding structure and the bottom wall, and a slot in the other of the sliding structure and the bottom wall, said pin being slidable in said slot.

With such an embodiment, the mutual position between the sliding structure and the bottom wall is variable in a continuous range, it being locked in the desired position for example by an adhesive or by mechanical fixing means.

In an alternative embodiment, the reader comprises a yielding pin in one of the sliding structure and the bottom wall, and a plurality of aligned holes in the other of the sliding structure and the bottom wall, sized to house said yielding pin.

With such an embodiment, the mutual position between the sliding structure and the bottom wall is variable among a plurality of prefixed positions, without the need for providing further fixing means.

Preferably the reader includes two light sources at the sides of said photodetector device, and said illumination optics comprises two lenses, each associated with a light source. Such a symmetrical configuration facilitates generating an illumination figure that is uniform or at least appropriate to make the light detected by the photodetector device uniform, obviously apart from the modulations due to the presence of the optical code itself.

Preferably, at least one lens of the illumination optics and one lens of the receiving optics are made on a common body.

In this way the required alignment operations needed are further reduced. Moreover, the weight and the overall size of the reader turn out to be reduced in that different supports for such optical elements are unnecessary.

Advantageously, said common body can also form a front wall of the reader, thus constituting a structural element of the sliding structure and of the reader itself.

Preferably, moreover, the reader comprises a shield extended at the upper and lateral walls of the reader.

In this way the shield is effective as an optical shield of the receiving chamber and of said at least one illumination chamber, and also as a mechanic support and/or electrical shield of a printed circuit board containing the components for processing the signal generated by the photodetector device.

Advantageously the inner faces of the shield are darkened at said at least one illumination chamber, to avoid that the illumination lens receives light from uncontrolled directions (e.g. through internal reflections).

Alternatively, the inner faces of the shield can be mirror-like at said at least one illumination chamber, to the aim of increasing the illumination.

Preferably said receiving optics comprises at least one fixed focal length lens.

Alternatively or in addition, said receiving optics comprises a variable focal length lens.

Said variable focal length lens is preferably a lens having a focal length variable as a function of an applied electrical voltage. In this way it is possible to keep the overall size and the weight of the reader low, by avoiding the need for electromechanical actuators.

More particularly said variable focal length lens can be selected from the group comprised of a lens of a conductive material of variable shape, a lens of a conductive material of variable optical density, a hollow lens containing at least a liquid with a variable curvature.

Typically said at least one light source is selected from the group comprised of light emitting diodes (LEDs), laser diodes (LDs) and vertical cavity surface emitting lasers (VCSELs), and a combination thereof.

Typically the reader can further comprise means for projecting onto the reading plane at least one of an aiming luminous figure and a luminous figure indicative of the reading result.

Preferably said projecting means comprises at least one light source and at least portions of said at least one lens of the illumination optics.

Typically the photodetector device is a linear or matrix sensor.

Preferably the optical code reader of the invention has a volume less than 5000 mm$^3$ and more preferably comprised within 21.5 mm×17.5 mm×12.5 mm.

The illumination optics can further comprise a diaphragm associated with said at least one light source.

In FIGS. 1 to 8 an optical code reader 1 according to a first embodiment of the invention is diagrammatically shown.

Figure 1:
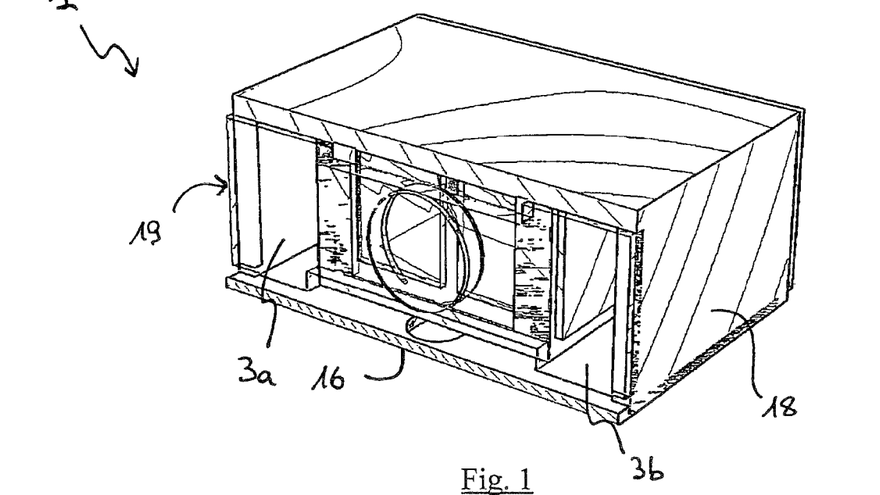
FIG. 1 shows a perspective view of a reader according to a first embodiment of the invention.
Figure 2:
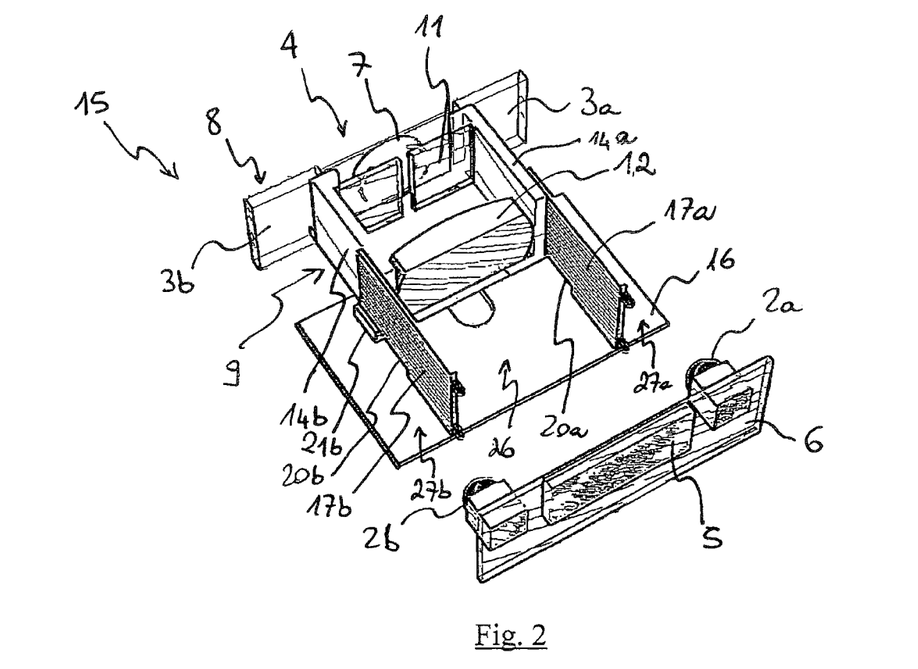
FIG. 2 shows a partially exploded perspective view of part of the internal components of the reader of FIG. 1.

Reader 1 is an imager reader of linear optical codes and it comprises two LED light sources 2a, 2b, an illumination optics comprising two lenses 3a, 3b for projecting the light emitted from the LED sources 2a, 2b into an illumination figure, and a receiving optics 4 for collecting the light diffused by a linear optical code illuminated by the illumination figure onto a linear photodetector device or sensor 5.

In the case of a linear reader as shown, the illumination figure should substantially be an illumination line, and therefore the two lenses 3a, 3b should carry out the function of diffusing the light emitted by sources 2a, 2b in a first direction, perpendicular to the bars and to the spaces of a bar code, and of concentrating the light by sources 2a, 2b in a direction orthogonal to the first direction.

Lenses 3a, 3b can be for example cylindrical lenses, but preferably they are locally defined profile lenses, described in the patent application entitled "Optical code reader", filed on even date as the present application in the name of the same Applicant, herein incorporated by reference.

Reader 1 can further comprise means, not shown, for projecting onto a reading plane, besides the substantially linear illumination figure, an aiming luminous figure, which aids the user to aim at the optical code, especially in the case of a portable reader 1, e.g. a pair of small bars orthogonal to the ends of the illumination line.

Such means can comprise for example one or more LED light sources of a color different from that of the illumination LEDs 2a, 2b, and/or one or more slits in the peripheral regions of the lenses 3a, 3b. Moreover, one of the lenses 3a, 3b could be appointed to the illumination function and the other to the generation of the aiming luminous figure.

Alternatively or additionally, the light sources 2a, 2b and/or the illumination lenses 3a, 3b can be analogously configured to project onto the reading plane, besides the substantially linear illumination figure, a luminous figure for signaling the reading result.

In case of using the innovative lens of the above identified patent application, the above mentioned additional functions can be taken into consideration when designing the local slopes of the surfaces of the lenses 3a, 3b.

The LED sources 2a, 2b are mounted at the sensor 5 sides, on a common printed circuit board (PCB) 6, which forms a rear side of the reader 1. The mounting of such elements on the same board allows to be obtained the mutual alignment directly in a manufacturing step, a dedicated alignment step being unnecessary.

Common PCB 6 preferably also comprises the front-end electronics for pre-processing the signal output by the linear sensor 5, as for instance filters and analog amplifiers, as well as an analog-to-digital converter for converting the properly pre-processed signal into a digital signal.

Figure 3:
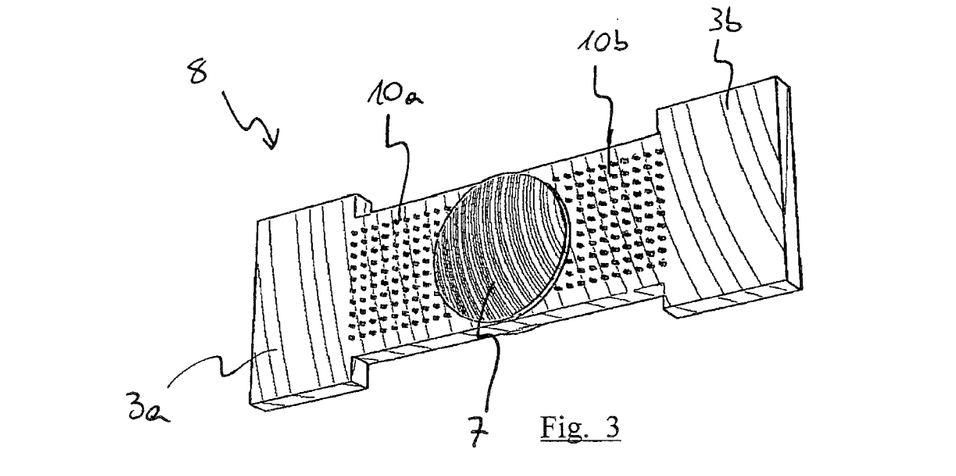
FIG. 3 shows a perspective view of part of the optics of the reader of FIG. 1, in a first embodiment thereof.

The lenses of the illumination optics 3a, 3b and one lens 7 of the receiving optics are made on a common body 8, which forms a front wall of the reader 1, thus constituting a structural element thereof. Making the three lenses 3a, 3b, 7 on the common body 8 allows the mutual alignment to be directly obtained in the manufacturing step, without a dedicated mutual alignment step, and also allows supporting and mounting elements for the individual lenses to be avoided.

The common body 8 is fixed, e.g. by ultrasonic welding, bonding or constraining, to an open-box-like frame 9.

The common body 8 can be made by plastic injection molding, and between the lens 7 of the receiving optics 4 and the two lenses 3a, 3b of the illumination optics two diffusing, e.g. rough or opaque, regions 10a, 10b can be made, in order to hinder the light ray's transmission between the adjacent lenses. Alternatively, the common body 8 can be made by co-molding two plastic materials, a transparent one for the lenses 3a, 3b, 7 and an opaque one for the regions 10a, 10b intermediate between them.

Figure 4:
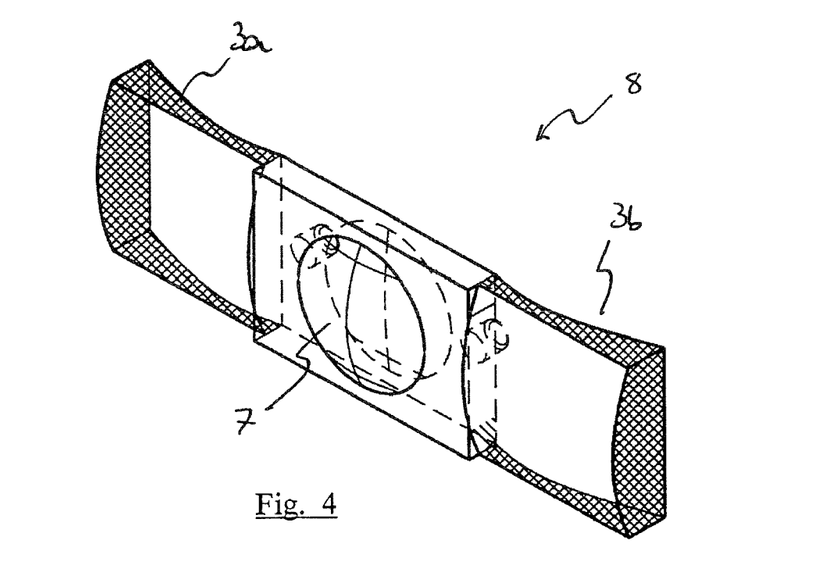
FIG. 4 shows a perspective view of part of the optics of the reader of FIG. 1, in a second embodiment thereof.

The edge walls of the common body 8 are properly treated, for example making them opaque or blackened, as schematically indicated by the cross-hatching in FIG. 4, in order to avoid lateral light entrance from the surrounding environment.

The receiving optics 4 comprises, besides the above mentioned lens 7, a diaphragm 11 fixed to the frame 9 in proximity to the common body 8, and an optical group 12 comprising one or more lenses fixed in the frame 9. The frame 9 thus ensures the alignment between the various components of the receiving optics 4, and also of them with respect to the illumination optics 3a, 3b.

The optical group 12 preferably comprises a fixed focal length lens.

Alternatively the lens has a variable focal length, and more specifically as a function of an applied electrical voltage, so that it can be driven simply through two supply wires arriving at electrodes on the variable focal length lens, which do not contribute to the overall size, weight and costs of the reader 1.

The variable focal length lens of the optical group 12 can be a lens of a conductive material of variable shape, a lens of a conductive material of variable optical density, a hollow lens containing a variable curvature liquid, a hollow lens containing two unmixable liquids, at least one of them being of a variable curvature. Lenses of the above mentioned type are known in the art and therefore a detailed description thereof will not be provided.

The frame 9 is more particularly fixed to the common body 8 in such a position that the lens 7 part of the receiving optics 4 is extended between two parallel walls 14a, 14b of the frame 9, while the illumination optics lenses 3a, 3b laterally project from frame 9.

Said frame 9 and the optical components of the reader 1 thus form a drawer structure 15.

This drawer structure 15 is made slidable with respect to the PCB 6 bearing the LED sources 2a, 2b and the sensor 5 in the following way.

The PCB 6 is orthogonally fixed to a bottom wall 16 of the reader 1, from which two inner walls 17a, 17b project, parallel to the lateral sides 18, 19 of the reader 1.

The two inner walls 17a, 17b are internally spaced by an amount substantially corresponding to the external distance between the walls 14a, 14b of the frame 9, and therefore they act as a guide for the sliding of the drawing structure 15 on the bottom wall 16 of the reader 1.

In order to increase the guiding function, the front part of the inner walls 17a, 17b is hung above the bottom wall 16, thus forming two slits 20a, 20b within which two lugs 21a, 21b (only lug 21b is visible in FIG. 2), laterally protruding from the walls 14a, 14b of the frame 9 slide.

The drawer structure 15 sliding along the bottom wall 16 of the reader 1 allows for the simultaneous changing of the focusing distance of the LED sources 2a, 2b onto the optical code through the illumination optics 3a, 3b, and the focusing distance of the optical code onto sensor 5 through the receiving optics 4. Such focusing distances are also changed in the same direction, namely, both in the illumination path and in the receiving path, to the drawing structure 15 sliding towards the rear wall or PCB 6, a longer focusing distance corresponds, and to the drawing structure 15 sliding in the opposed direction, away from the rear wall or PCB 6, a shorter focusing distance corresponds.

Although it is possible to provide for a proper actuator to automatically change the focusing distance during the use of the reader, in the reader 1 shown there is no actuator, which would add a notable increase of costs, weight and overall size of the reader. On the contrary, the sliding of the sliding structure 15 occurs manually, in a step of configuring the reader 1. It is worthwhile highlighting that such a configuration step does not need complex mutual alignment operations between light sources 2a, 2b, sensor 5, illumination optics 3a, 3b and receiving optics 4, such an alignment being in any case ensured in any sliding position of the drawer structure 15. The configuration step can thus be quickly carried out during the manufacturing process and even by the buyer of the reader 1.

Figure 5:
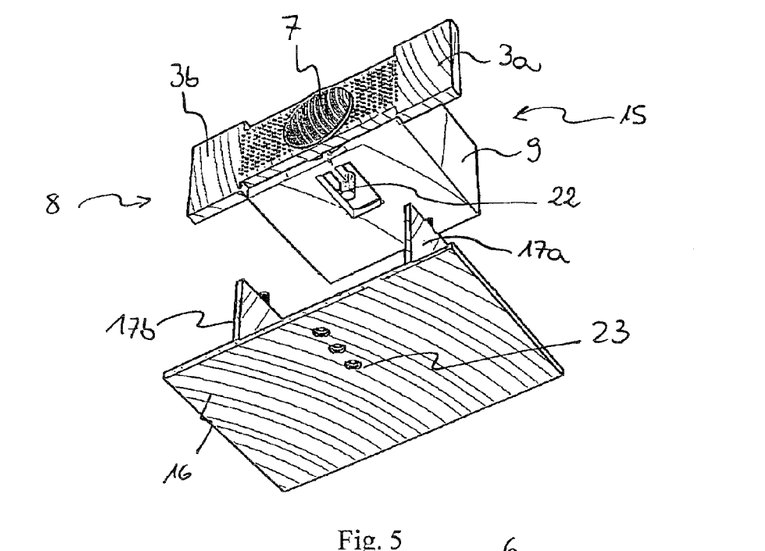
FIG. 5 shows a perspective bottom view of mutual sliding means of some parts of the reader of FIG. 1, in a first embodiment thereof.

As a further guiding means and for fixing the sliding position of the drawer structure 15, in a first embodiment, as shown in FIG. 5, a snap yielding pin 22 is provided on the bottom of the sliding structure 15, and a plurality of aligned holes 23 are provided on the bottom wall 16 (or vice versa). By inserting the pin 22 in one of the holes 23, the desired focusing position is maintained in a very simple manner, which however can only be selected among a plurality of predetermined positions, dictated by the positions of the holes 23.

Figure 6:
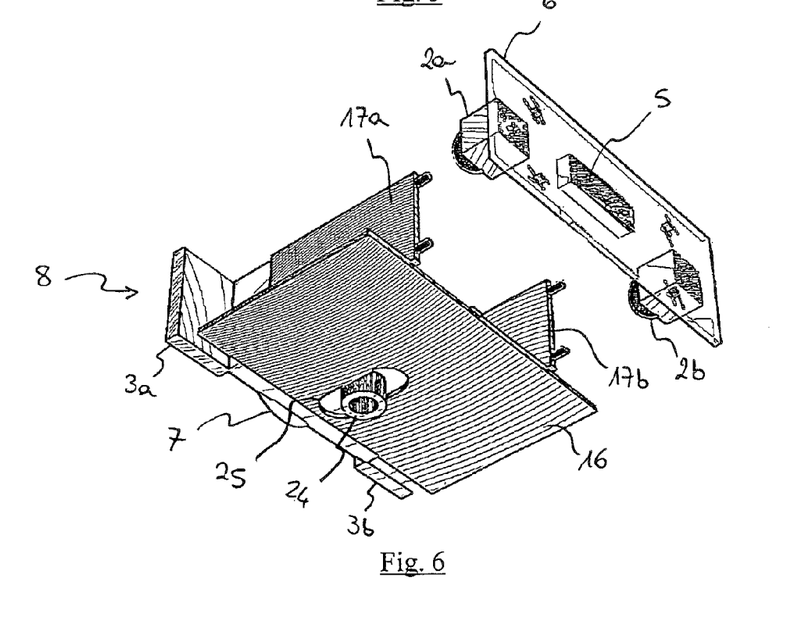
FIG. 6 shows a perspective bottom view of mutual sliding means of some parts of the reader of FIG. 1, in a second embodiment thereof.

In an alternative embodiment, as shown in FIG. 6, on the bottom of the sliding structure 15 a pin 24 is provided, and on the bottom wall 16 a slot 25 is provided, inside which pin 24 slides (or vice versa). In this embodiment, the mutual position between the sliding structure 15 and the bottom wall 16 is variable in a continuous range, but it is necessary to fix the desired position, e.g. through an adhesive or other fixing means.

As it is manifest in FIG. 2, the inner walls 17a, 17b physically and optically bound three different chambers, which have a variable depth thanks to the above described sliding means: a central receiving chamber 26 comprising the receiving optics 4 and the sensor 5, and two lateral illumination chamber 27a, 27b comprising the light sources 2a, 2b and the illumination optics 3a, 3b.

Figure 7:
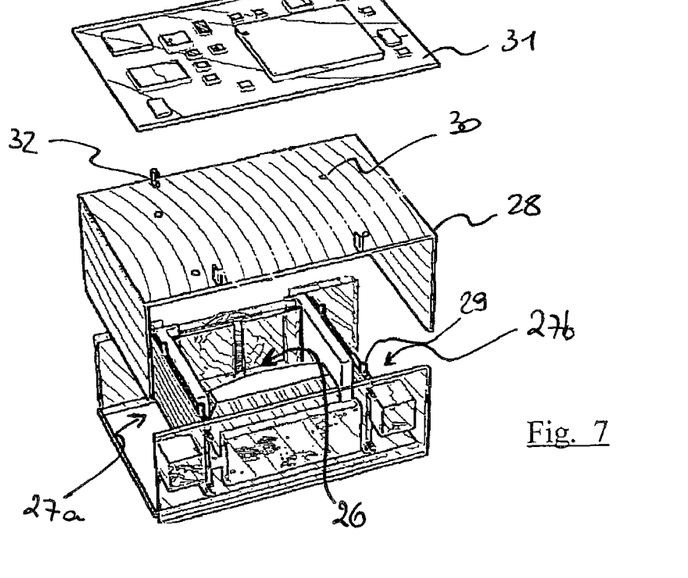
FIG. 7 shows a partially exploded perspective view of the reader of FIG. 1, with a first embodiment of shielding means.

As shown in FIG. 7, a shield 28 bounds the receiving chamber 26 above and bounds the illumination chamber 27a, 27b above and laterally. The shield 28 has a C-shaped section and it is fixed to the upper edges of the inner walls 17a, 17b through the coupling of pins 29 in holes 30. The shield 28 is made of a conductive metal and it is anodized or darkened in another way.

The shield 28 thus serves as an optical shield for the receiving chamber 26 and for the illumination chambers 27a, 27b.

Moreover, a second printed circuit board or PCB 31 is fixed on the top of the shield 28 and more particularly welded to pins 32 protruding therefrom. On PCB 31, the electronic components for controlling the reader, for processing the digital signal generated by the PCB 6 bearing sensor 5 and illumination sources 2a, 2b, and for interfacing with a decoding device external to reader 1 are made. Thus, shield 28 also carries out the function of supporting the PCB 31 and the function of electrically conductive shield to protect the electronic components from noise.

As an alternative to two distinct PCBs 6 and 31, the electronic components of reader 1 can be gathered in a single PCB of the rigid-flex type, having two rigid regions corresponding to PCBs 6 and 31 joined by a flexible portion.

It is understood that the distribution of the electronics between the PCBs 6 and 31 can be changed with respect to what is above described, and that also the decoding electronics can be made inside the reader 1, as well as conversely all or part of the electronics for processing the signal generated by sensor 5, and possibly also the electronics for controlling the reader, can be decentralized in a host processor.

Moreover, those regions of the inner face of the shield 28 placed at the illumination chambers 27a, 27b can be darkened to avoid that lenses 3a, 3b receive light from not controllable directions, or they can be reflective to increase the light collection from sources 2a, 2b, so as to increase the efficiency of the illumination system.

Figure 8:
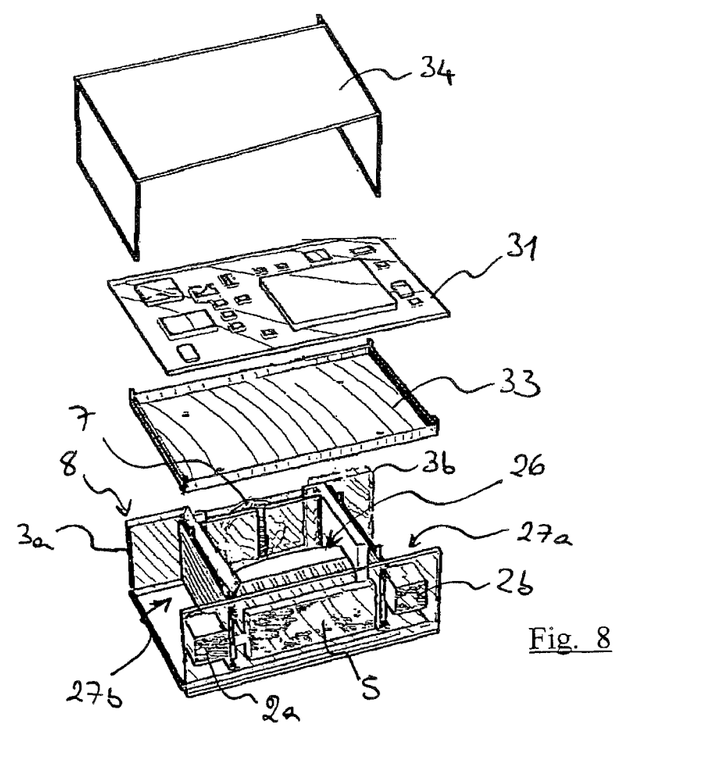
FIG. 8 shows a partially exploded perspective view of the reader of FIG. 1, with a second embodiment of shielding means.

In FIG. 8 an alternative embodiment to that of FIG. 7 is shown, wherein shield 28 is replaced by a flat shield 33 that bounds above the receiving chamber 26 and the illumination chambers 27a, 27b, and that serves as a support for the PCB 31, and by a shield 34 with C-shaped section that serves as an electrostatic shield and as a lateral covering for the illumination chambers 27a, 27b.

The above described reader 1 has therefore a substantially parallelepiped shape, and in a practical embodiment its size can be contained within about 21.5 mm×17.5 mm×12.5 mm, i.e. in a volume less than 5000 mm$^3$. The reader 1 is thus particularly compact and highly miniaturized, in particular mirrors for deflecting the optical illumination and receiving paths and actuators for moving the optics are avoided.

However, it is understood that the common PCB 6 could be placed parallel to the bottom wall 16 of the reader, for example mounted thereon, light deflecting oblique mirrors in the emitting path and in the receiving path being provided.

To increase the luminosity, each of the light sources 2a, 2b can comprise an array of LEDs.

The light sources 2a, 2b can, as an alternative to the LEDs, be laser diodes (LDs) or vertical cavity superficial emission lasers (VCSELs), and also a combination thereof.

There can also be a single illumination chamber, by providing for one of the two inner walls 17a, 17b to project substantially at a lateral edge of the bottom wall 16, or by providing a single inner wall. In this case, there will be a single LED, LD or VCSEL light source or a single group of such sources, associated with a single illumination lens.

It will be understood that the illumination optics associated with the light sources 2a, 2b can also comprise lenses integrally within the LED sources 2a, 2b themselves, as well as a diaphragm for selecting a portion of the light beam emitted by the LED sources 2a, 2b. In the case of diaphragms, these could for example be fixed to the bottom wall 16 of the reader 1 or to the common PCB 6.

Figure 9:
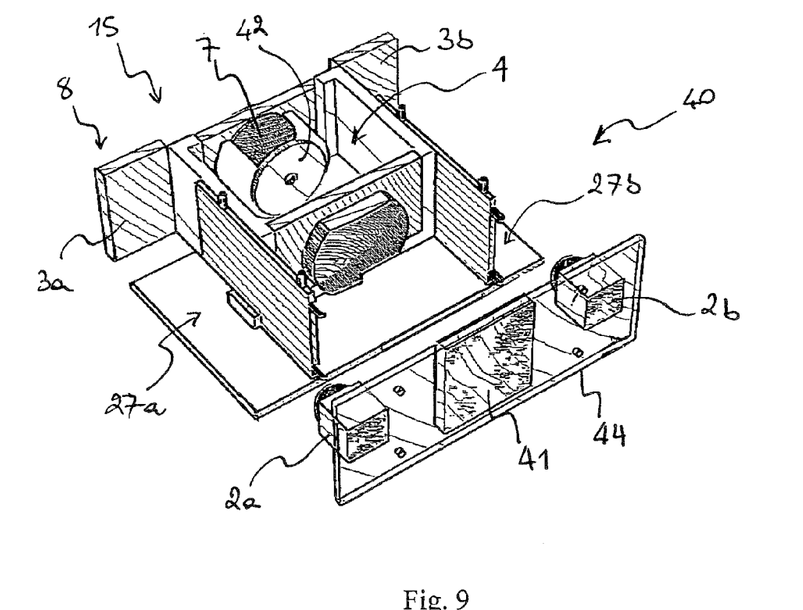
FIG. 9 shows a partially exploded perspective view of part of the inner components of a reader according to a second embodiment of the invention.

In FIG. 9 a two-dimensional reader is shown, indicated with reference number 40. In reader 40, the linear sensor 5 is replaced by a two-dimensional photo-sensitive device or sensor 41. Diaphragm 10 is replaced by a diaphragm 42 having a circular opening, which is fixed directly to the inner face of the common body 8 at the front lens 7 of the receiving optics 4. The lenses 3a, 3b of the illumination optics are configured to generate an illumination figure adequate to read a two-dimensional optical code, typically substantially rectangular or square. The lenses 3a, 3b of the illumination optics can be refractive or diffractive lenses.

Figure 10:
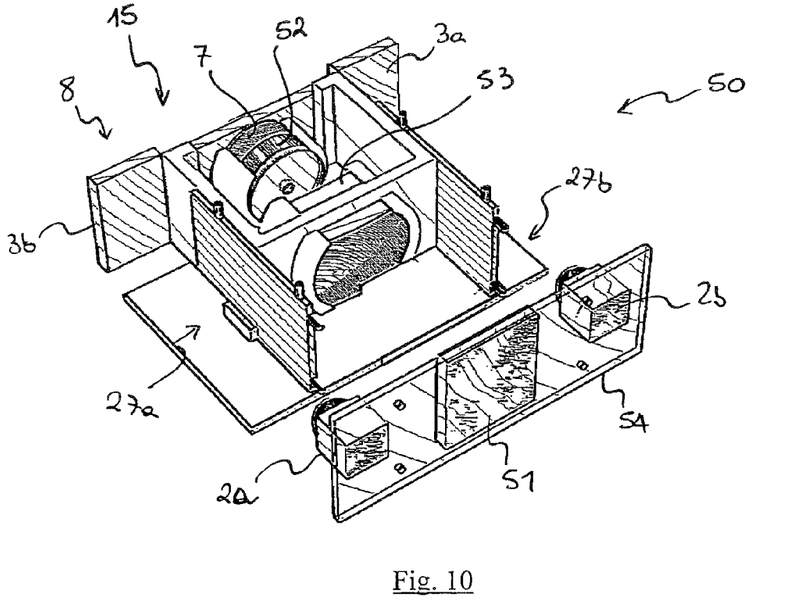
FIG. 10 shows a partially exploded perspective view of part of the inner components of a reader according to a third embodiment of the invention.

In FIG. 10 a second two-dimensional reader is shown, indicated with reference number 50, which differs from reader 40 in that the receiving optics comprises a further lens 52 directly fixed to the inner face of the common body 8, and a further lens 53 fixed to the frame 12.

Also in the case of two-dimensional readers 40 and 50, the illumination chamber 27a, 27b can be configured to project onto the reading plane, besides the proper illumination figure, an aiming luminous figure, for example indicative of at least two opposed edges of the illumination luminous figure, and/or a luminous figure for signaling the reading result.

As to the rest, readers 40 and 50 are identical with reader 1 and for simplicity only some components are numbered. It is thus understood that the manufacture of one-dimensional readers 1 and of two-dimensional readers 40, 50 shares the manufacture of many components, an advantageous aspect in producing and stocking terms.

In particular, it suffices to replace the PCB 6 bearing the light sources 2a, 3a and the linear sensor 5 with the PCB 44 or 54 bearing the light sources 2a, 3a and the two-dimensional sensor 41 or 51, and to replace the drawer structure 15 incorporating the receiving optics 4 and the illumination lenses 3a, 3b, and the second PCB 31 to configure the reader as a linear reader or as a two-dimensional reader.

Figure 11:
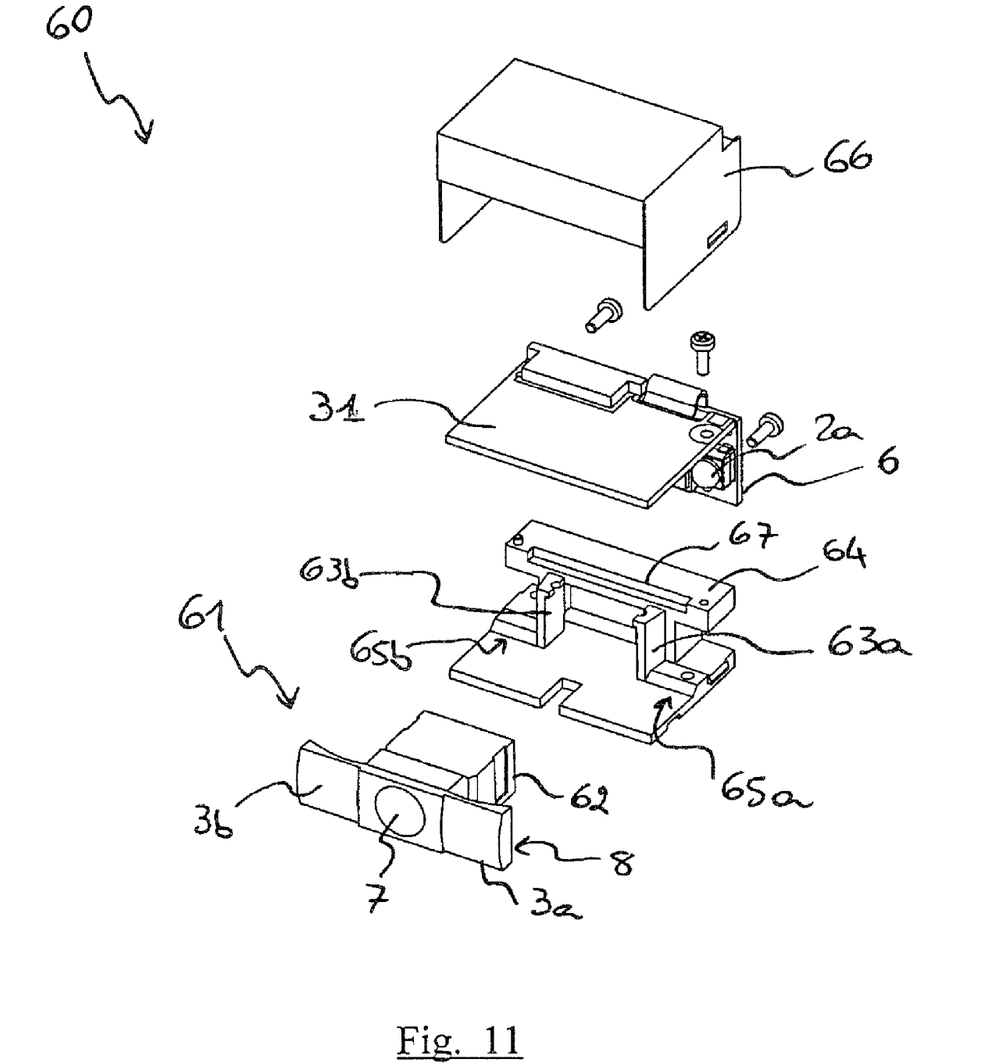
FIGS. 11 to 13 show views according to different exploded perspectives of a reader according to a fourth embodiment of the invention.
Figure 12:
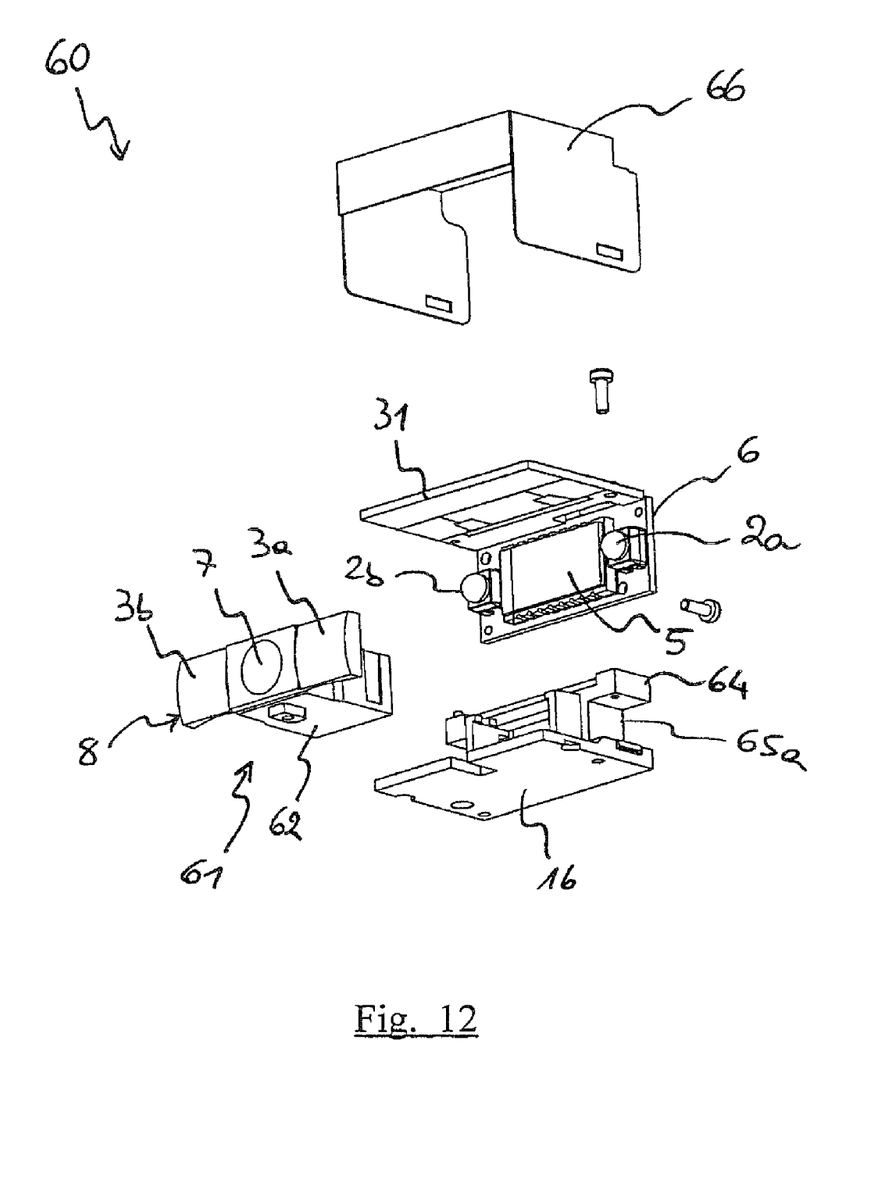
Figure 13:
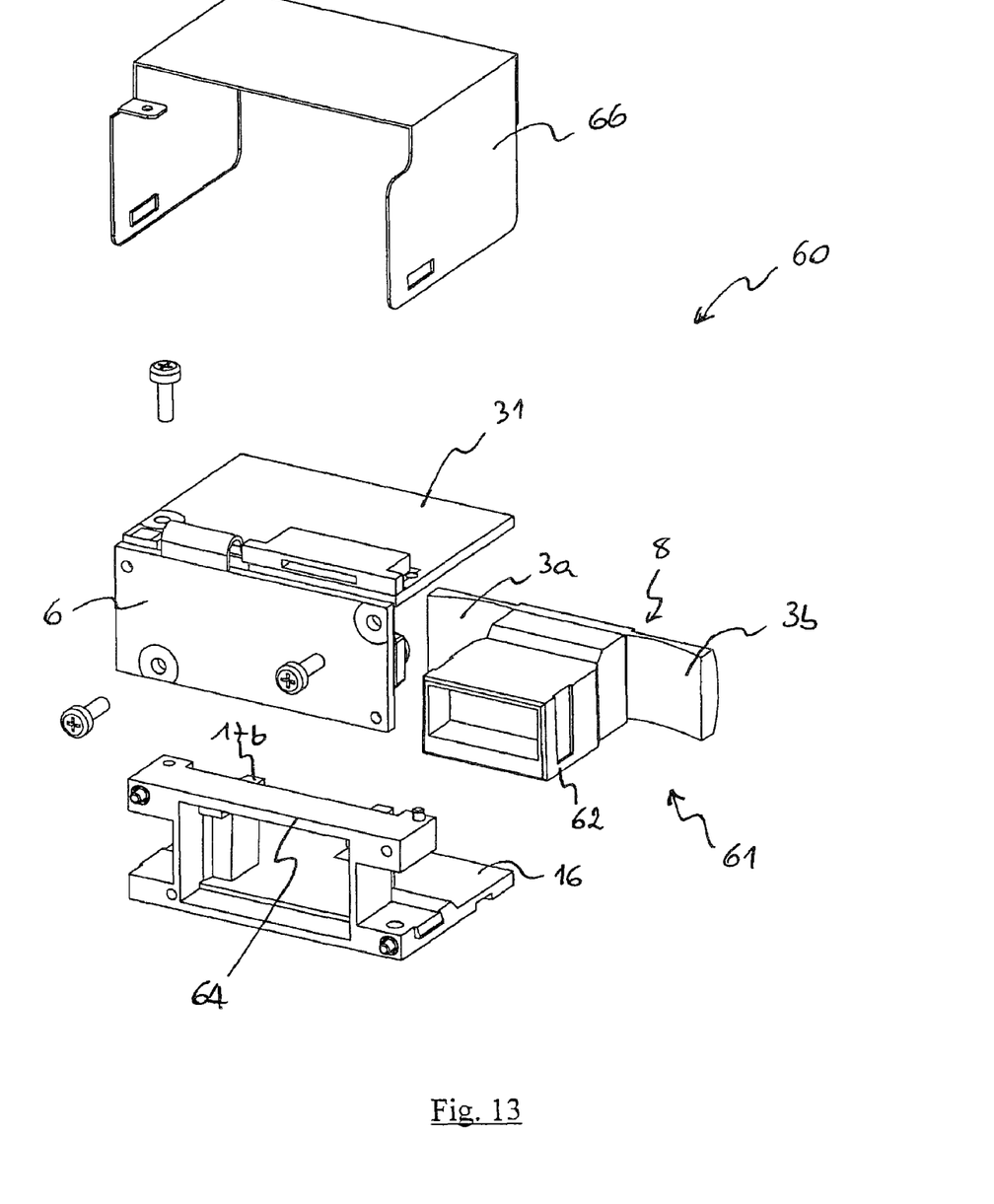

In FIGS. 11 to 13 a further embodiment of a reader 60 is shown, which differs from reader 1 in that, in the sliding drawer structure 61, the frame 62 is closed superiorly. The inner walls 63a, 63b extend only partially towards the front of the reader, and towards the rear they are surmounted by a cross-piece 64 which also serves as a shield for the LEDs 2a, 2b as it protrudes laterally cantilevered into the illumination chambers 65a, 65b, which chambers are partially bounded by the drawer structure 61 and in particular by the frame 62. So a single C-shaped shield, indicated with 66, is sufficient.

The cross-piece 64 has a step-like reduction 67 which can house any electronic component protruding from the bottom face of the second PCB 31.

Figure 14:
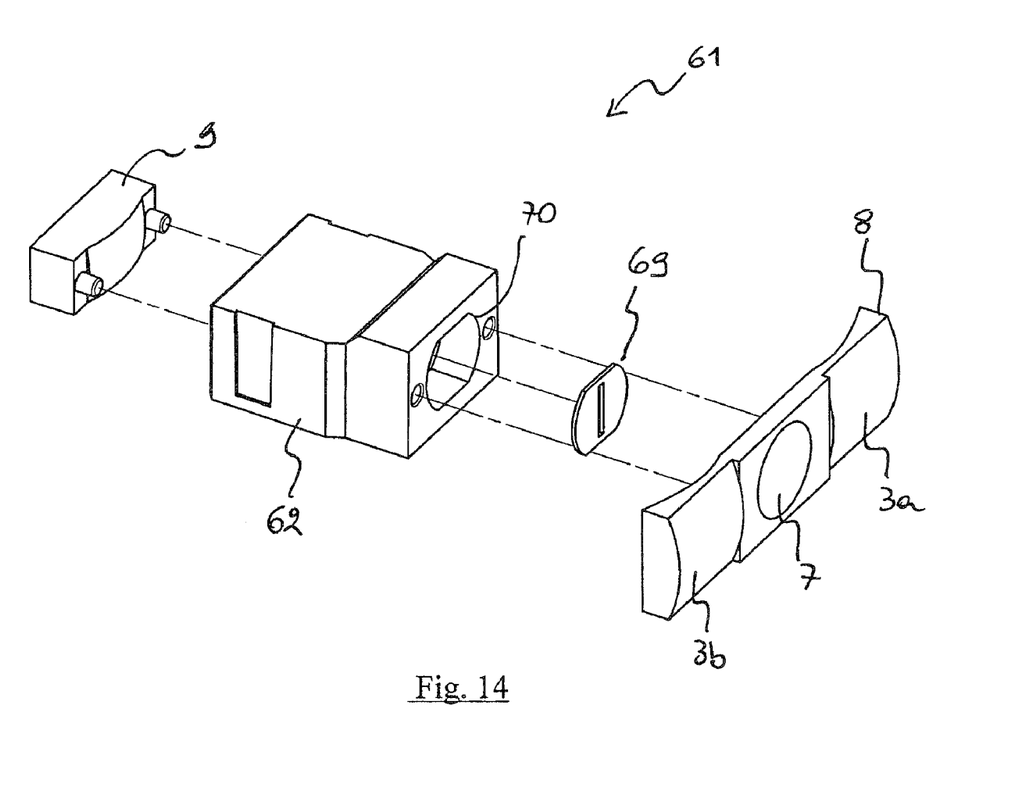
FIG. 14 shows an exploded perspective view of part of the inner components of the reader of FIGS. 11-13.

In FIG. 14 the sliding drawer structure 61 of this embodiment is shown, which has the frame 62, the diaphragm 69 housed in a seat 70 of the frame 62, the rear lens 9 of the receiving optics 4 and the common body 8 on which the receiving lens 7 and the illumination optics lenses 3a, 3b are made.

It will be noted that the common body 8 is totally transparent, i.e. it does not comprise the diffusing or opaque regions 10a, 10b present on the contrary in the element of the FIG. 3, because in the surroundings of the lens 7 of the receiving optics it is in contact and so optically shielded by the frame 62 itself.

It will be understood that the reader of the invention, in any of the above described embodiments, can be housed in a housing of a portable type or of a fixed type, for any kind of application of optical code reading.

The invention claimed is:

1. An optical code reader of the imager type, comprising:
   at least one non-collimated light source having an illumination optics associated comprising at least one lens; and
   a photodetector device having a receiving optics associated therewith, comprising at least one lens, wherein the at least one lens of the illumination optics and the at least one lens of the receiving optics are displaceable together to change their distance from said at least one light source and from said photodetector device respectively.

2. The reader according to claim 1, wherein said at least one light source and said photodetector device are fixed in position within the reader, and said at least one lens of the illumination optics and said at least one lens of the receiving optics are mounted in a structure sliding within the reader.

3. The reader according to claim 2, wherein said at least one light source and said photodetector device are mounted on a common printed circuit board fixed to a bottom wall of the reader, and wherein said sliding structure is slidable on said bottom wall and the illumination optics and the receiving optics are mounted in said sliding structure.

4. The reader according to claim 3, wherein at least one inner wall is provided, upright from said bottom wall towards the interior of the reader said at least one upright wall serving as a sliding guide for said sliding structure.

5. The reader according to claim 4, wherein said at least one upright wall at least partially bounds a receiving chamber comprising the photodetector device and the receiving optics, and at least one illumination chamber comprising the illumination optics and at least one light source.

6. The reader according to claim 3, further comprising a pin in one selected from the sliding structure and the bottom wall, and a slot in the other one selected from the sliding structure and the bottom wall, said pin being slidable in said slot.

7. The reader according to claim 3, further comprising a yielding pin in one selected from the sliding structure and the bottom wall, and a plurality of aligned holes in the other one selected from the sliding structure and the bottom wall, sized to house said yielding pin.

8. The reader according to claim 1, comprising two light sources at the sides of said photodetector device, and wherein said illumination optics comprises two lenses, each associated with a light source.

9. The reader according to claim 1, wherein said at least one lens of the illumination optics and a lens of the receiving optics are made on a common body.

10. The reader according to claim 9, wherein said common body forms a front wall of the reader.

11. The reader according to claim 1, wherein said reader comprises upper and lateral walls, said reader further comprising a shield extended at the upper and lateral walls of the reader.

12. The reader according to claim 11, wherein inner sides of the shield are darkened at at least one illumination chamber comprising the illumination optics and at least one light source.

13. The reader according to claim 11, wherein the inner sides of the shield are mirror-like at at least one illumination chamber comprising the illumination optics and at least one light source.

14. The reader according to claim 1, wherein said receiving optics comprises at least one fixed focal length lens.

15. The reader according to claim 1, wherein said receiving optics comprises at least one variable focal length lens.

16. The reader according to claim 15, wherein said variable focal length lens is a lens having a focal length variable as a function of an applied electrical voltage.

17. The reader according to claim 16, wherein said variable focal length lens is selected from the group consisting of a lens of a conductive material of variable shape, a lens of a conductive material of variable optical density, and a hollow lens containing at least one variable curvature liquid.

18. The reader according to claim 1, wherein said at least one light source is selected from the group consisting of light emitting diodes (LEDs), laser diodes (LDs) and vertical cavity surface emitting lasers (VCSELs), and a combination thereof.

19. The reader according to claim 1, further comprising means for projecting onto a reading plane at least one of an aiming luminous figure and a luminous figure indicative of the reading result.

20. The reader according to claim 19, wherein said projecting means comprises at least one light source and at least portions of said at least one lens of the illumination optics.

21. The reader according to claim 1, wherein the photodetector device is a linear sensor or a matrix sensor.

22. The reader according to claim 1, wherein the reader has a volume less than 5000 mm$^3$.

23. The reader according to claim 1, wherein the illumination optics comprises at least one diaphragm associated with said at least one light source.

* * * * *

UNITED STATES PATENT AND TRADEMARK OFFICE
CERTIFICATE OF CORRECTION

PATENT NO.        : 8,276,819 B2                                      Page 1 of 1
APPLICATION NO.   : 12/158745
DATED             : October 2, 2012
INVENTOR(S)       : Federico Canini et al.

It is certified that error appears in the above-identified patent and that said Letters Patent is hereby corrected as shown below:

Column 9, line 63, delete "," after the word therewith; and

Column 9, line 67, insert --,-- after the word device.

Signed and Sealed this
Fourth Day of December, 2012

David J. Kappos
*Director of the United States Patent and Trademark Office*